United States Patent Office 3,085,887
Patented Apr. 16, 1963

3,085,887
GLASS COMPOSITION
Dominick Labino, Grand Rapids, and Lawrence V. Gagin, Toledo, Ohio, assignors, by mesne assignments, to Johns-Manville Fiber Glass Inc., New York, N.Y., a corporation of Delaware
No Drawing. Continuation of application Ser. No. 716,011, Feb. 19, 1958. This application Oct. 25, 1960, Ser. No. 64,748
11 Claims. (Cl. 106—50)

This invention relates to glass compositions.

More specifically this invention relates to glass compositions which are particularly useful in the production of glass fibers.

This invention further relates to glass compositions particularly adapted to the production of glass fibers, which compositions are characterized by low softening points and low liquidus temperatures. Additionally the fibers produced from the present compositions are characterized by improved resistance against chemical attack.

This application is a continuation application of our copending United States patent application Serial No. 716,011, filed February 19, 1958 and now abandoned, which in turn is a continuation-in-part of our then co-pending United States patent application Serial No. 561,647, filed January 26, 1956, and now abandoned.

In present day commercial operations, glass fibers are produced by two general methods. The so-called continuous fibers are produced by a mechanical attenuation process wherein molten streams of glass exuded through orifices in a glass melting chamber are drawn out into very fine fibers. The fibers are wrapped or wound on a rapidly rotating drum which provides the attenuation force. The so-called staple fibers are produced by a gas attenuation process. One common gas attenuation process now used comprises first forming primary filaments by mechanically attenuating molten glass streams and then passing the primary fibers into contact with a gas stream of high velocity and high temperature. The effect of the high velocity, high temperature gas is to melt the primary filaments and blow them or attenuate them into fibers of very small diameter and short lengths.

Continuous fibers are useful for weaving into cloth for the reinforcement of plastic laminates, in the field of electrical insulation, etc. The staple or wool fibers either in bulk form or in the form of mats or batts find many uses including use as insulation materials for homes, buildings, and other structures, for filtering gases and liquids, etc.

Satisfactory production of fibers by the above listed methods requires that the glass compositions have rigidly defined characteristics. One of the primary requirements is that the glass have a relatively low melting and working temperature, preferably less than about 2000° F. so that it may be readily worked on a continuous and rapid basis with a minimum input of energy required for melting it. Additionally the glass must have a viscosity which will permit it to be exuded in the form of small streams and yet a viscosity which will prevent the glass from flooding through the apertures from which it is worked. Also the viscosity curve should be sufficiently long or flat so that the molten streams can be attenuated to greatly reduce their diameter before solidification as fine filaments. In addition the glass must have a sufficiently low surface tension in a molten state to permit its being drawn out into extremely fine filament form.

Glass compositions which have heretofore been produced to meet the requirements of melting point, viscosity, and surface tension required for the production of fine filaments by mechanical or gas attenuation processes have also been characterized by relatively high working temperatures.

It is accordingly an object of this invention to provide glass compositions which are particularly adapted to the production of glass fibers by either mechanical or gas attenuation operations.

It is another object to produce glass compositions particularly adapted to the production of fibers, which compositions are characterized by working temperature appreciably below 2000° F. and which compositions are adapted to the production of fine glass fibers having a very high resistance to chemical attack.

Glass compositions forming the basis of this invention consist of the following in the indicated proportions:

| Constituent: | Percent by weight |
|---|---|
| $SiO_2$ | 47–60 |
| $B_2O_3$ | 9–15 |
| $Al_2O_3$ | 5–10.5 |
| $Na_2O$ | 8–13 |
| $K_2O$ | 2–5 |
| $CaO$ | 1–4 |
| $MgO$ | 0.05–1.0 |
| $BaO$ | 2–6 |
| $ZnO$ | 2–6 |
| $CaF_2$ | 1.0–3 |

The boron oxide in this formula serves as a flux and other flux materials may be substituted as a portion of this component, such as soda or potash to the extent of about 2% by weight.

The $Al_2O_3$ component is employed to improve chemical durability of the glass and tends to inhibit devitrification. This component may contain trace amounts, i.e., less than 1% by weight, of $TiO_2$ and $Fe_2O_3$.

Glass compositions exhibiting optimum properties for fiberization at decidedly low temperatures of less than about 1500° F. and hence the preferred fiber compositions comprise the following in the approximate percentages by weight:

| Constituent: | Percent by weight |
|---|---|
| $SiO_2$ | 47–60 |
| $B_2O_3$ | 10–15 |
| $Al_2O_3$ | 5–10 |
| $Na_2O$ | 8–13 |
| $K_2O$ | 2–5 |
| $CaO$ | 1–2.75 |
| $MgO$ | 0.05–1 |
| $BaO$ | 2–6 |
| $ZnO$ | 3–6 |
| $CaF_2$ | 1–3 |

Glasses having compositions within the ranges set forth above are characterized by very low fiber softening points of from about 1200 to 1300° F. Compositions listed below were tested and found to have fiber softening points of 1250 to 1280° F. The glasses are also characterized by low liquidus temperatures generally in the range from about 1300 to 1500° F. The resistance of fibers of such compositions against water loss is extremely high, and fibers tested have shown weight losses of less than 3% when tested in water. Also, the resistance of fibers against chemical attack is very good which will be shown in the examples below.

The invention may be explained more fully by reference to the following examples of glass compositions which are particularly suitable for the practice of the invention:

*Example I*

| Constituent: | Percent by weight as calculated from batch |
|---|---|
| $SiO_2$ | 48.9 |
| $B_2O_3$ | 12.8 |
| $Al_2O_3$ | 9.5 |
| $Na_2O$ | 11.2 |
| $K_2O$ | 4.0 |
| CaO | 2.4 |
| MgO | 0.1 |
| BaO | 3.9 |
| ZnO | 4.7 |
| $CaF_2$ | 2.1 |

The above glass composition was characterized by a fiber softening point of 1260° F.; liquidus temperature of 1445° F.; and fibers made therefrom had a weight loss after immersion in water of only 2.05%. The $H_2O$ used to leach the fibers had an electrical resistance after the test of 10,500 ohms. The percent loss of the fibers to 1.0 N $H_2SO_4$ was 28.8 weight percent; and the resistance to alkali is demonstrated by a loss of only 6.4 weight percent.

The above composition was found to be extremely useful for the production of staple glass fibers of very fine diameter by a flame attenuation process and throughput was extremely high.

*Example II*

| Constituent: | Percent by weight as calculated from batch |
|---|---|
| $SiO_2$ | 49.8 |
| $B_2O_3$ | 12.8 |
| $Al_2O_3$ | 8.6 |
| $Na_2O$ | 11.1 |
| $K_2O$ | 4.0 |
| CaO | 2.4 |
| MgO | 0.1 |
| BaO | 3.9 |
| ZnO | 4.7 |
| $CaF_2$ | 2.1 |

This glass composition was found to have a fiber softening point of 1260° F. and a liquidus temperature of 1350° F. Fibers produced from this composition after immersion in water were found to have a weight loss of only 2.04% and the water used to test the fibers had an electrical resistance of 10,000 ohms. The fibers had a weight loss after immersion of 1.0 N $H_2SO_4$ of 19.8%. This glass composition, like the composition of Example I was found to be particularly advantageous for the production of flame blown staple fibers and provided a high throughput. It will be noted that the slight change in proportion of the $SiO_2$ and $Al_2O_3$ constituents resulted in an appreciable increase in resistance against acid loss.

*Example III*

| Constituent: | Percent by weight as calculated from batch |
|---|---|
| $SiO_2$ | 56.2 |
| $B_2O_3$ | 12.2 |
| $Al_2O_3$ | 5.6 |
| $Na_2O$ | 10.5 |
| $K_2O$ | 3.1 |
| CaO | 1.3 |
| MgO | 0.2 |
| BaO | 5.0 |
| ZnO | 3.8 |
| $CaF_2$ | 2.1 |

The above glass composition was found to have a fiber softening point of 1280° F. and a liquidus temperature of 1350° F. Water loss of fibers produced from the composition was 2.02 weight percent with the water used to test the fibers having an electrical resistance after the test of 10,000 ohms. The fibers had an extremely high resistance to acid and lost only 2.34 weight percent after immersion in 1.0 N $H_2SO_4$. The fibers also had a high resistance to alkali and lost only 8.14 weight percent after immersion in 0.1 N NaOH. It will be noted that the slight increase in silica and MgO and BaO, with corresponding slight decreases in other constituents resulted in a slightly increased fiber softening point, and an unexpectedly high resistance against acid loss.

It will be understood that this invention is susceptible to modification in order to adapt it to different usages and conditions and accordingly, it is desired to comprehend such modifications within this invention as may fall within the scope of the appended claims.

What we claim is:

1. A glass composition having a fiber softening point of from about 1200 to 1300° F. and a liquidus temperature in the range of from about 1300 to 1500° F. which consists essentially of the following ingredients:

| Constituent: | Percent by weight |
|---|---|
| $SiO_2$ | 47–60 |
| $B_2O_3$ | 10–15 |
| $Al_2O_3$ | 5–10 |
| $Na_2O$ | 8–13 |
| $K_2O$ | 2–5 |
| CaO | 1–2.75 |
| MgO | 0.05–1 |
| BaO | 2–6 |
| ZnO | 3–6 |
| $CaF_2$ | 1–3 |

2. A glass composition having a fiber softening point of from about 1200 to 1300° F. and a liquidus temperature in the range of from about 1300 to about 1500° F. consisting essentially of the following ingredients in the approximate percentages by weight:

| Constituent: | Percent by weight |
|---|---|
| $SiO_2$ | 48.9–56.2 |
| $B_2O_3$ | 12.2–12.8 |
| $Al_2O_3$ | 5.6–9.5 |
| $Na_2O$ | 10.5–11.2 |
| $K_2O$ | 3.1–4.0 |
| CaO | 1.3–2.4 |
| MgO | 0.1–0.2 |
| BaO | 3.9–5.0 |
| ZnO | 3.8–4.7 |
| $CaF_2$ | 2.1 |

3. A glass having a liquidus temperature of about 1445° F. consisting essentially of the following ingredients by weight as calculated from the batch:

| Constituent: | Percent by weight |
|---|---|
| $SiO_2$ | 48.9 |
| $B_2O_3$ | 12.8 |
| $Al_2O_3$ | 9.5 |
| $Na_2O$ | 11.2 |
| $K_2O$ | 4.0 |
| CaO | 2.4 |
| BaO | 3.9 |
| ZnO | 4.7 |
| $CaF_2$ | 2.1 |
| MgO | 0.1 |

4. A glass having a liquidus temperature of about 1350° F. consisting essentially of the following ingredients by weight as calculated from the batch:

| Constituent: | Percent by weight |
|---|---|
| $SiO_2$ | 49.8 |
| $B_2O_3$ | 12.8 |
| $Al_2O_3$ | 8.6 |
| $Na_2O$ | 11.1 |
| $K_2O$ | 4.0 |
| CaO | 2.4 |
| MgO | 0.1 |
| BaO | 3.9 |
| ZnO | 4.7 |
| $CaF_2$ | 2.1 |

5. A glass having a liquidus temperature of about 1350° F. consisting essentially of the following ingredients by weight as calculated from the batch:

| Constituent: | Percent by weight |
|---|---|
| $SiO_2$ | 56.2 |
| $B_2O_3$ | 12.2 |
| $Al_2O_3$ | 5.6 |
| $Na_2O$ | 10.5 |
| $K_2O$ | 3.1 |
| CaO | 1.3 |
| MgO | 0.2 |
| BaO | 5.0 |
| ZnO | 3.8 |
| $CaF_2$ | 2.1 |

6. A glass fiber composition having a fiber softening point of from about 1200 to 1300° F. and a liquidus temperature in the range of from about 1300 to 1500° F. which consists essentially of the following ingredients:

| Constituent: | Percent by weight |
|---|---|
| $SiO_2$ | 47–60 |
| $B_2O_3$ | 10–15 |
| $Al_2O_3$ | 5–10 |
| $Na_2O$ | 8–13 |
| $K_2O$ | 2–5 |
| CaO | 1–2.75 |
| MgO | 0.05–1 |
| BaO | 2–6 |
| ZnO | 3–6 |
| $CaF_2$ | 1–3 |

7. A glass fiber composition having a fiber softening point from about 1200 to about 1300° F. and a liquidus temperature in the range of from about 1300 to about 1500° F. consisting essentially of the following ingredients in the approximate percentages by weight:

| Constituent: | Percent by weight |
|---|---|
| $SiO_2$ | 48.9–56.2 |
| $B_2O_3$ | 12.2–12.8 |
| $Al_2O_3$ | 5.6–9.5 |
| $Na_2O$ | 10.5–11.2 |
| $K_2O$ | 3.1–4.0 |
| CaO | 1.3–2.4 |
| MgO | 0.1–0.2 |
| BaO | 3.9–5.0 |
| ZnO | 3.8–4.7 |
| $CaF_2$ | 2.1 |

8. Glass fiber having a liquidus temperature of about 1445° F. consisting essentially of the following ingredients by weight:

| Constituent: | Percent by weight |
|---|---|
| $SiO_2$ | 48.9 |
| $B_2O_3$ | 12.8 |
| $Al_2O_3$ | 9.5 |
| $Na_2O$ | 11.2 |
| $K_2O$ | 4.0 |
| CaO | 2.4 |
| MgO | 0.1 |
| BaO | 3.9 |
| ZnO | 4.7 |
| $CaF_2$ | 2.1 |

9. Glass fiber having a liquidus temperature of about 1350° F. consisting essentially of the following ingredients by weight:

| Constituent: | Percent by weight |
|---|---|
| $SiO_2$ | 49.8 |
| $B_2O_3$ | 12.8 |
| $Al_2O_3$ | 8.6 |
| $Na_2O$ | 11.1 |
| $K_2O$ | 4.0 |
| CaO | 2.4 |
| MgO | 0.1 |
| BaO | 3.9 |
| ZnO | 4.7 |
| $CaF_2$ | 2.1 |

10. Glass fiber having a liquidus temperature of about 1350° F. consisting essentially of the following ingredients by weight:

| Constituent: | Percent by weight |
|---|---|
| $SiO_2$ | 56.2 |
| $B_2O_3$ | 12.2 |
| $Al_2O_3$ | 5.6 |
| $Na_2O$ | 10.5 |
| $K_2O$ | 3.1 |
| CaO | 1.3 |
| MgO | 0.2 |
| BaO | 5.0 |
| ZnO | 3.8 |
| $CaF_2$ | 2.1 |

11. A glass wool lightweight batt wherein the glass has a composition having a fiber softening point of from about 1200 to 1300° F. and a liquidus temperature in the range of from about 1300 to 1500° F. which consists essentially of the following ingredients:

| Constituent: | Percent by weight |
|---|---|
| $SiO_2$ | 47–60 |
| $B_2O_3$ | 10–15 |
| $Al_2O_3$ | 5–10 |
| $Na_2O$ | 8–13 |
| $K_2O$ | 2–5 |
| CaO | 1–2.75 |
| MgO | 0.05–1 |
| BaO | 2–6 |
| ZnO | 3–6 |
| $CaF_2$ | 1–3 |

References Cited in the file of this patent

UNITED STATES PATENTS 2,877,124   Welsch _____ Mar. 10, 1959